(12) United States Patent
Ota et al.

(10) Patent No.: US 6,428,119 B2
(45) Date of Patent: Aug. 6, 2002

(54) CONTROL DEVICE FOR ANTILOCK BRAKE DEVICE

(75) Inventors: Atsuo Ota; Shinji Goto, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,219

(22) Filed: Mar. 29, 2001

(30) Foreign Application Priority Data

Mar. 29, 2000 (JP) ........................................ 2000-091189

(51) Int. Cl.⁷ .......................... F16H 35/10; B60T 8/32; B60T 8/34; F16D 7/02
(52) U.S. Cl. .................................... 303/115.2; 303/137
(58) Field of Search .............................. 303/115.2, 162, 303/137, 153; 188/161, 162, 181 A, 181 R, 344; 701/74, 70, 71; 180/197

(56) References Cited

U.S. PATENT DOCUMENTS

| 5,249,848 A | * | 10/1993 | Matsuto et al. |
| 5,257,856 A | * | 11/1993 | Ota et al. |
| 5,297,859 A | * | 3/1994 | Suzuki et al. |
| 5,365,444 A | * | 11/1994 | Suzuki et al. |
| 5,573,313 A | * | 11/1996 | Suzuki et al. |

FOREIGN PATENT DOCUMENTS

| JP | 579543 | 3/1993 |

* cited by examiner

Primary Examiner—Douglas C. Butler
(74) Attorney, Agent, or Firm—Birch, Stewart, Kolasch & Birch, LLP

(57) ABSTRACT

An ABS return control device for retracting an expander piston to an ABS non-operation position by turning a crank mechanism by a servomotor includes a first procedure of driving the servomotor with a position precedent to a turning limit. At the turning limit, the movement of the crank mechanism is limited by a stopper member. A target angle and a second procedure of driving the servomotor by updating the target angle with the turning limit is further disclosed. The ABS return control device permits reduction of a conventional actuator in size and weight by controlling the kinetic energy of a positioning member of the crank mechanism turned by a servomotor at the time of collision against the stopper member.

17 Claims, 6 Drawing Sheets

CONTROL DEVICE FOR ANTILOCK BRAKE DEVICE

BACKGROUND OF THE INVENTION

1. Field of the Invention

The present invention relates to a control device for an antilock brake system, and more particularly to a control device for an antilock brake system in which braking hydraulic pressure is controlled by a turning angle of a servomotor.

2. Background Art

An antilock brake system (ABS) for performing optimum brake control has been mounted on conventional vehicles. In the ABS, a slip rate is calculated from the rotation speed of a wheel of the running vehicle and the vehicle velocity, and the optimum brake control is performed based on the calculated slip rate.

In an ABS according to the conventional art, as disclosed in Japanese Pre-examination Patent Publication (KOKAI) No.Hei 5-79543 (1993), an actuator for an antilock brake for reducing, maintaining and increasing the braking hydraulic pressure is connected between a master cylinder and a caliper cylinder. The master cylinder is responsible for converting a brake operation to hydraulic pressure. The actuator incorporates a servomotor for displacing a crankshaft of the actuator based on slip rate information of the vehicle, and the crankshaft opens and closes a cut valve through an expander piston, thereby controlling the braking hydraulic pressure applied to the caliper cylinder.

Stopper members are preliminarily provided at an upper limit position and a lower limit position of a turning range of the crankshaft. When the upper limit position or the lower limit position is given as a target angle to the servomotor, the crankshaft or a member in the vicinity of the crankshaft is turned until a positioning member provided in the vicinity of the crankshaft/member comes to collide with the stopper member.

However, in the conventional art as mentioned hereinabove, the positioning member collides against the stopper member at a high speed when a target position for the servomotor is set at either the upper limit position or the lower limit position. Therefore, the positioning member and the stopper members must be provided with sufficient mechanical strength. This structural requirement further hinders size reduction and weight reduction attempts of the designer of an actuator.

SUMMARY OF THE INVENTION

The present invention overcomes the shortcomings associated with the related art and achieves other advantages not realized by the related art.

It is an aspect of the present invention to provide a control device for an antilock brake system which solves the above-mentioned problems in the prior art.

It is an aspect of the present invention to provide a control device that permits an actuator to be reduced in size and weight by moderating the collision of a positioning member against a stopper member.

These and other aspects of the invention are accomplished by a control device for an antilock brake system comprising an input hydraulic chamber in communication with a master cylinder, an output hydraulic chamber in communication with a caliper cylinder of a brake, a cut valve in communication with the input hydraulic chamber and the output hydraulic chamber for providing a hydraulic cutoff condition, an expander piston for opening the cut valve, wherein the expander piston is located on an open end side of the cut valve in an open position, and the expander piston closes the cut valve by increasing a volume of the output hydraulic chamber in a closed position, wherein the expander position is located in a closed end side in the closed position, a crank mechanism for displacing said expander piston, a servomotor for turning said crank mechanism to a predetermined target angle, and a stopper member for setting a turning limit for said crank mechanism, said expander piston is displaced in a step of reaching said closed position during an ABS operation and being retracted to said open position during a non-ABS operation.

These and other aspects of the invention are accomplished by a control device for an antilock brake system comprising an input hydraulic chamber in communication with a master cylinder, an output hydraulic chamber in communication with a caliper cylinder of a brake, a cut valve in communication with said input hydraulic chamber and said output hydraulic chamber for providing a hydraulic cutoff condition, an expander piston for opening said cut valve, wherein said expander piston is located on an open end side of said cut valve in an open position, and said expander piston closes said cut valve by increasing a volume of said output hydraulic chamber in a closed position, wherein said expander position is located in a closed end side in said closed position, a return control for retracting the expander piston to said open and closed positions, the return control includes means for executing a first control procedure for driving the servomotor with a position precedent and a target angle to the turning limit, and means for executing a second control procedure for driving the servomotor by updating the target angle with the turning limit, a crank mechanism for displacing the expander piston, a servomotor for turning the crank mechanism to a predetermined target angle, and a stopper member for setting a turning limit for the crank mechanism, the expander piston is displaced in a step of reaching the closed position during an ABS operation and being retracted to the open position during a non-ABS operation.

According to the above description, a position precedent to the turning limit is first set as a turning target angle for the crank mechanism, so that the turning speed of the crank mechanism is only reduced at the position precedent to the turning limit. The target angle is then updated and the crank mechanism is again turned to the turning limit. Accordingly, the kinetic energy of the crank mechanism at the time of reaching the turning limit is smaller as compared with the case where the turning limit is set as the target angle from the beginning. The kinetic energy of the crank mechanism at the time of collision with the stopper member at the turning limit is advantageously reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not intended to limit the present invention to the embodiments shown, and wherein.

DETAILED DESCRIPTION OF THE PREFERRED EMBODIMENTS

Figure 1:
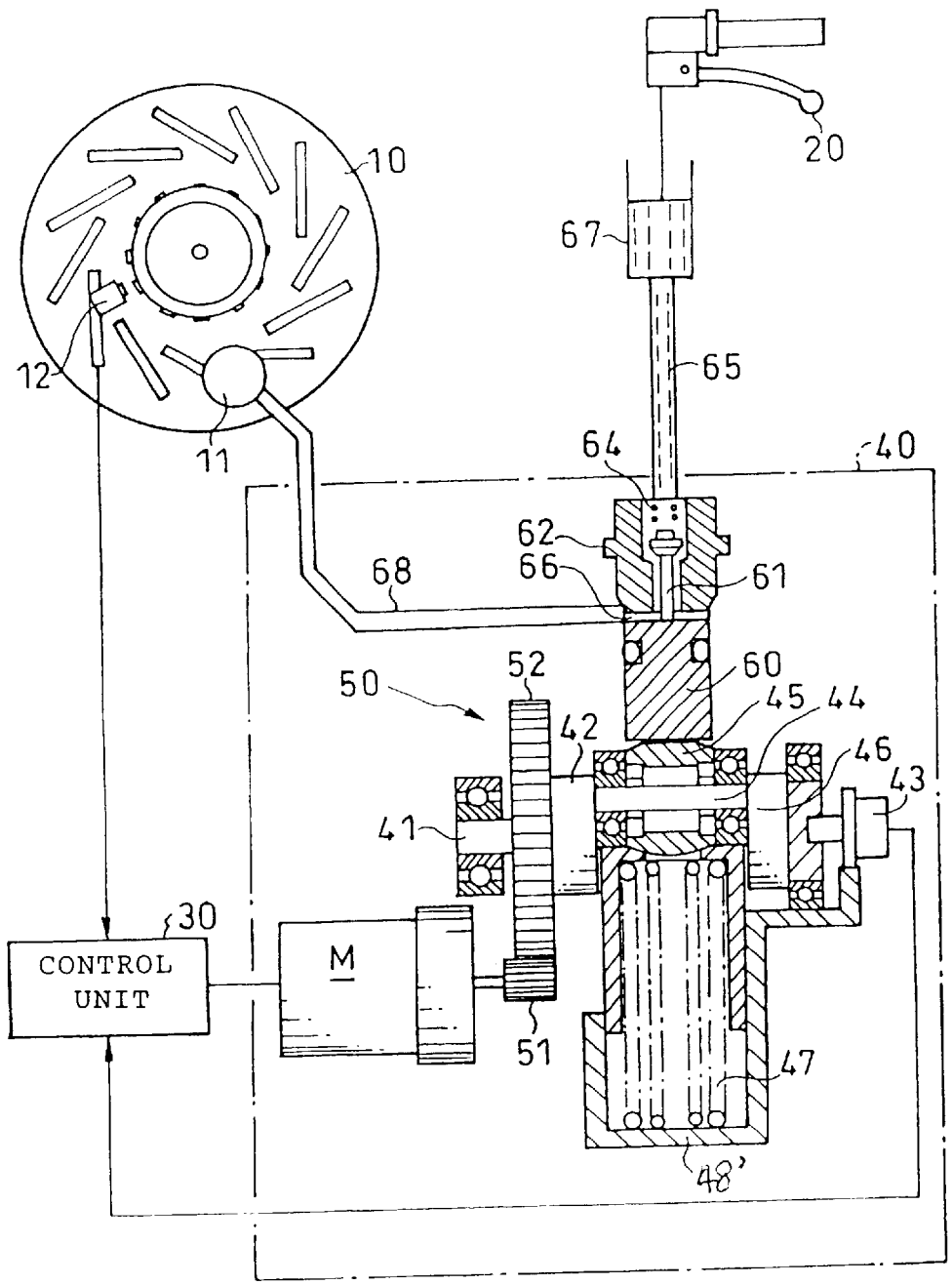
FIG. 1 is a schematic view of a brake control system according to an embodiment of the present invention.
Figure 2:
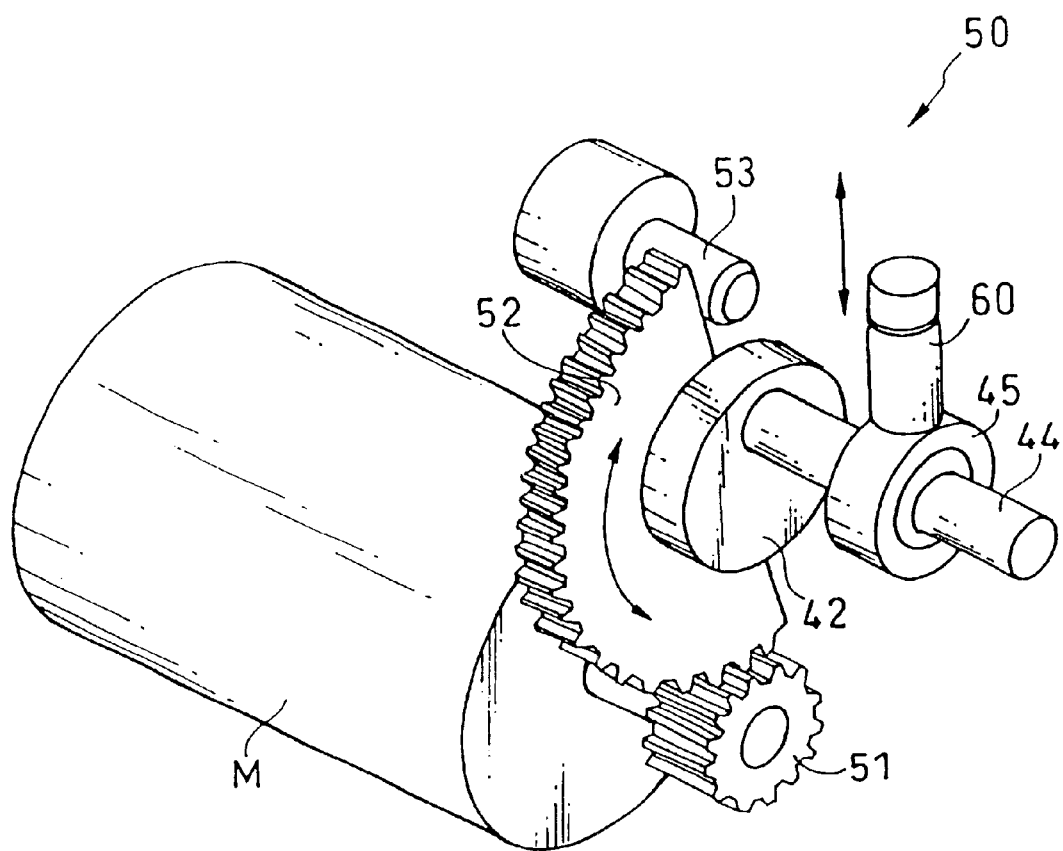
FIG. 2 is a side view of a modulator according to an embodiment of the present invention.
Figure 3:
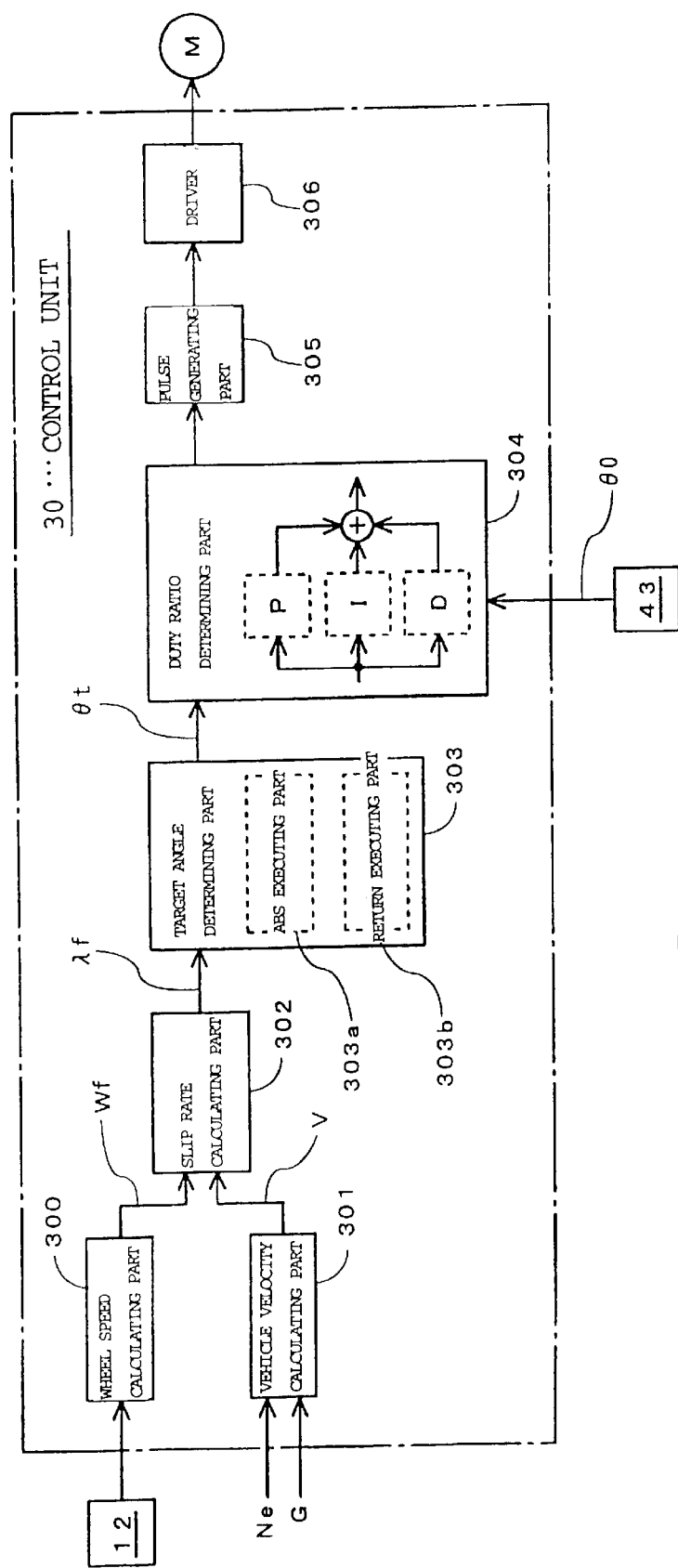
FIG. 3 is a schematic view of a portion of the control unit of FIG. 1.
Figure 4:
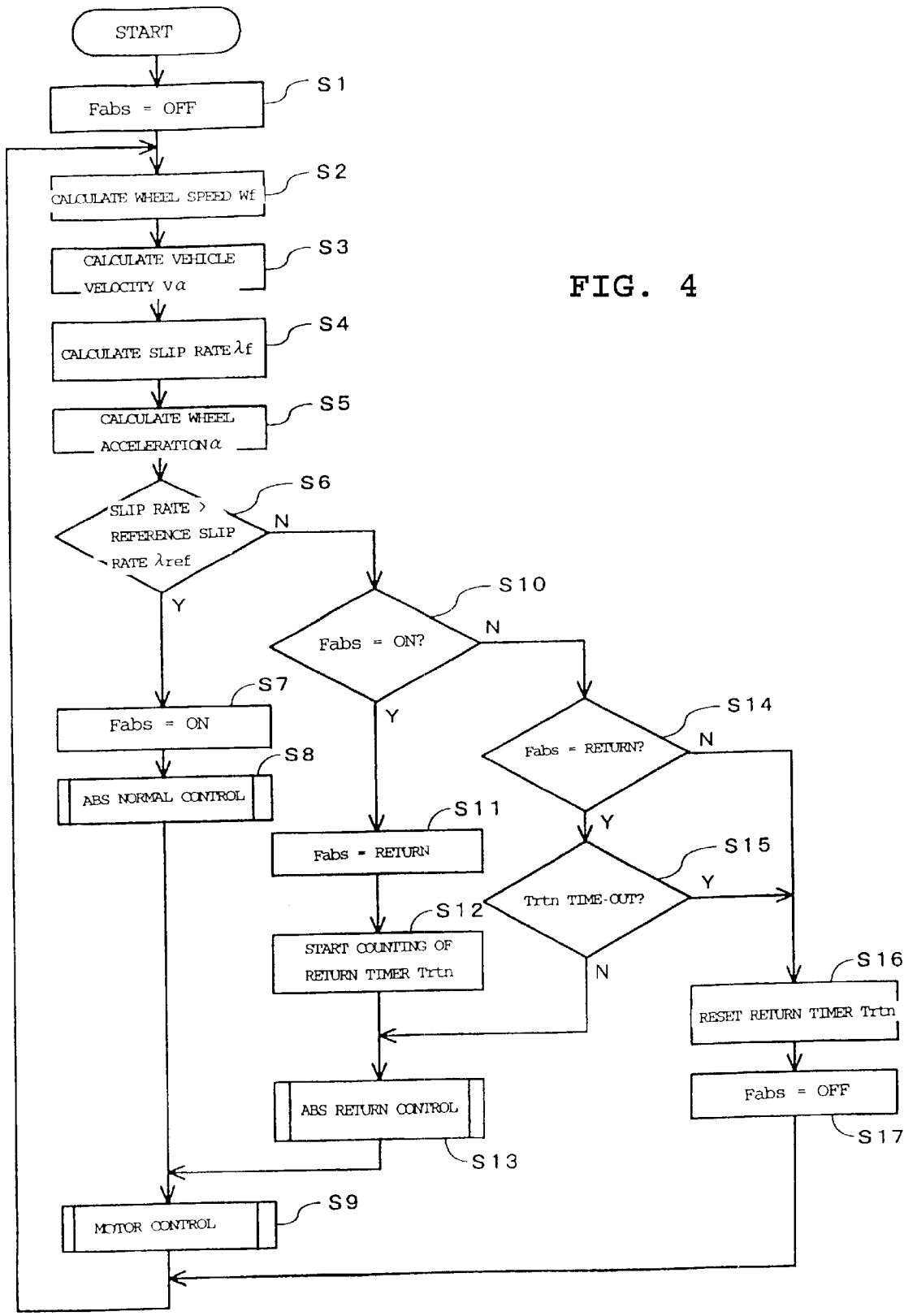
FIG. 4 is a flowchart of the operation of the invention according to an embodiment of the present invention.
Figure 5:
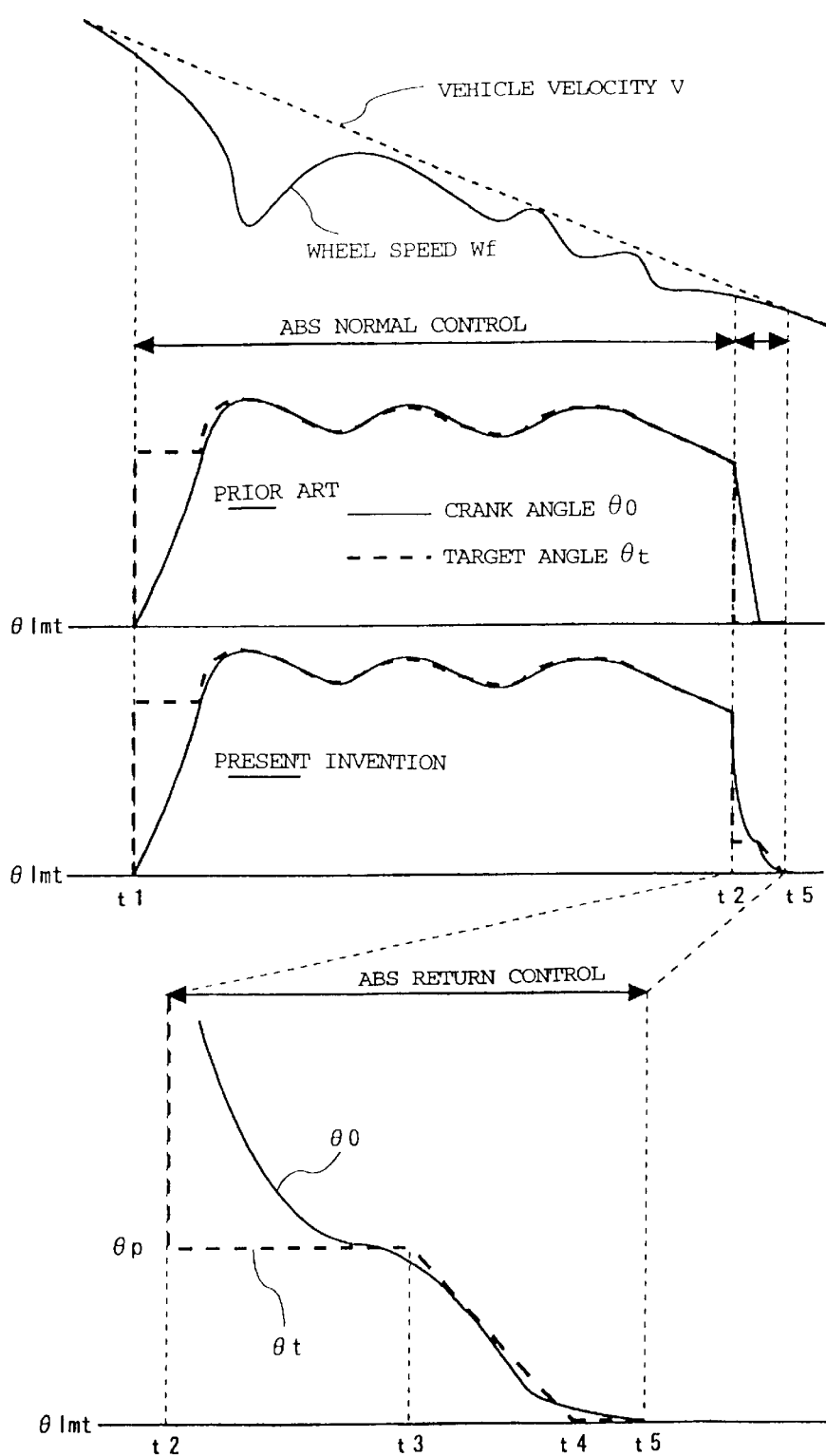
FIG. 5 is a graphical view of the operation of the invention according to an embodiment of the present invention.
Figure 6:
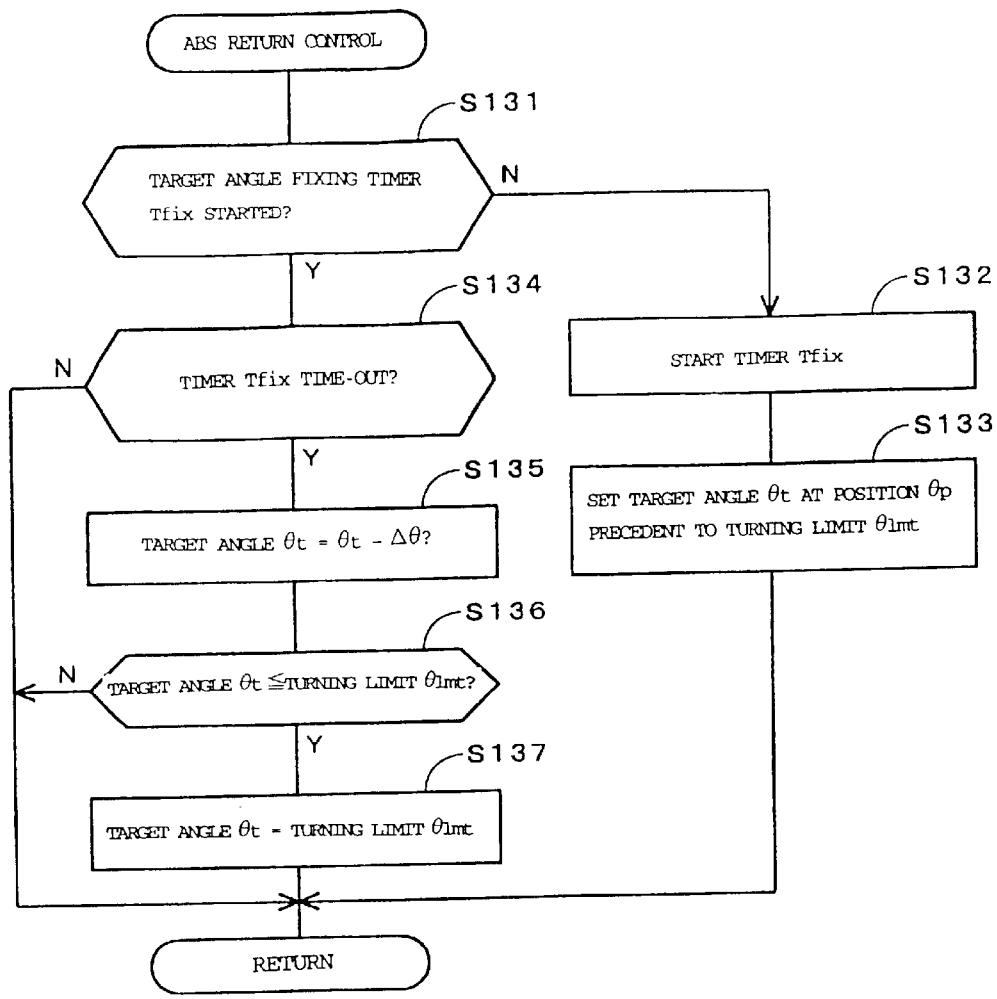
FIG. 6 is a flowchart showing the operation of a return control according to an embodiment of the present invention.

Hereinafter, the present invention will be described in detail with reference to the accompanying drawings. FIG. 1 is a schematic view of a brake control system according to an embodiment of the present invention. FIG. 2 is a side view of a modulator according to an embodiment of the present invention. FIG. 3 is a schematic view of a portion of the control unit of FIG. 1. FIG. 4 is a flowchart of the operation of the invention according to an embodiment of the present invention. FIG. 5 is a graphical view of the operation of the invention according to an embodiment of the present invention. FIG. 6 is a flowchart showing the operation of a return control according to an embodiment of the present invention.

FIG. 1 is a schematic view of a brake control system according to an embodiment of the present invention. A description of a brake control system incorporating an embodiment of the present invention will be made with reference to an example of the system to the front wheel.

The brake system includes a disk plate 10 arranged at a rotational shaft of the front wheel, a brake lever 20 fitted to a steering handle portion of the vehicle, a control unit 30, and a modulator 40 acting as an actuator for controlling the braking hydraulic pressure.

A caliper cylinder 11 supplied with braking hydraulic pressure from the modulator 40 generates a braking force. A wheel speed sensor 12 is mounted to the disk plate 10 along with the caliper cylinder 11. The rotating speed of the front wheel detected by the wheel speed sensor 12 is inputted to the control unit 30.

A DC servomotor M of the modulator 40 is connected with a crank mechanism 50. As shown in FIG. 2, the crank mechanism 50 comprises a pinion 51 axially attached to the rotary shaft of the DC servomotor M. A semicircular crank gear 52 is engaged with the pinion 51. A crankshaft 41 axially supports the crank gear 52. A crank pin 44 is eccentrically connected to the crank gear 52 through a crank arm 42, and a crank arm 46 is connected to a second end of the crank pin 44. The turning range of the crank gear 52 is limited by a stopper pin 53. A potentiometer 43 serving as a position sensor is fitted to the crank arm 46.

A cam bearing 45 is rotatably fitted to the crank pin 44, and is normally pressed toward one end by a spring force of a return spring 47 contained in a spring containing portion 48. An expander piston 60 is disposed in contact with the cam bearing 45 at a position symmetrical with a pressing position of the return spring 47. Therefore, as the cam bearing 45 is moved up and down, the expander piston 60 is displaced up and down in response thereto. This relationship results in the opening and closing of a cut valve 61.

A cut valve containing portion 62 incorporating the cut valve 61 is provided at an upper portion of the expander piston 60. A master cylinder 67 is connected to an input hydraulic chamber 64 of the cut valve containing portion 62 through piping 65. The caliper cylinder 11 is connected to an output hydraulic chamber 66 of the cut valve containing portion 62 through piping 68. It shall be appreciated by one of ordinary skill in the art that piping 65 and 68 may include multiple sections of piping or tubing for accomplishing distribution of pressurized braking fluid to multiple locations.

The master cylinder 67 and the caliper cylinder 11 are connected to each other through the piping 65, the modulator 40 and the piping 68. This hydraulic oil/braking circuit is filled with a hydraulic oil suitable for the vehicle's braking system. The master cylinder 68 converts an operation on the brake lever 20 into an oil pressure, and transmits the oil pressure to the cut valve containing portion 62.

The control unit 30 controls the turning angle of the DC servomotor M based on wheel speed information read from the wheel speed sensor 12 and an output value of the potentiometer 43 representing the angle of the crank mechanism 50 at the position of the crank arm 46.

In the arrangement described hereinabove, when the ABS is not operated, the crank gear 52 has been turned to a turning limit restricted by the stopper pin 53. Therefore, the expander piston 60 is located at one end side, and the cut valve 61 is open, so that a braking pressure in response to a brake operation is supplied to the caliper cylinder 11.

When the ABS is in an operating state, the crank gear 52 is turned by the servomotor M, and the expander piston 60 is lowered toward the other end side. By this action, the cut valve 61 is closed, and the volume of the output hydraulic chamber 66 is increased according to the position of the expander piston 60. Accordingly, the braking pressure supplied to the caliper cylinder 11 is reduced according to the position of the expander piston 60.

While the above description has been made in accordance with a brake control system arranged for a front wheel of a vehicle, a similar brake control system can also be arranged for the rear wheel.

FIG. 3 is a schematic view of a portion of the control unit 30 shown in FIG. 1. A wheel speed calculating part 300 calculates the wheel speed Wf based on an output signal from the wheel speed sensor 12. A vehicle velocity calculating section 301 calculates vehicle velocity V based on engine revolution number Ne and speed change gear stage G (or the wheel speed Wf or the like). A slip rate calculating section 302 calculates slip rate $\lambda f$ of a wheel based on the vehicle velocity V and the wheel speed Wf. A target angle determining section 303 determines a target angle $\theta t$ for the crank mechanism 50 based on the slip rate $\lambda f$.

A duty ratio determining section 304 determines a duty ratio of driving pulses supplied to the servomotor M by PID control. A pulse generating section 305 generates a train of pulses based on the determined duty ratio. A driver 306 drives the servomotor M based on the generated train of pulses.

Next, the operation of the present embodiment will be described referring to the flowcharts of FIGS. 4 and 6, and the graphical time chart of FIG. 5. FIG. 4 is a flowchart of the operation of the invention according to an embodiment of the present invention. FIG. 5 is a graphical view of the operation of the invention according to an embodiment of the present invention. FIG. 6 is a flowchart showing the operation of a return control according to an embodiment of the present invention.

In FIG. 5, the relationship between the target angle θt and actual angle θo of the crank mechanism 50, controlled according to the relationship between the vehicle velocity V and the wheel speed Wf, is shown for both the prior art and the present invention.

In step S1, a value representing the non-operating condition of ABS (OFF representative value) is set into an ABS flag (Fabs) described later. In step S2, an output signal from the wheel speed sensor 12 is taken into the wheel speed calculating section 300, and the wheel speed Wf of the front wheel is calculated. In step S3, the vehicle velocity V is obtained in the vehicle velocity calculating section 301. In this embodiment, the vehicle velocity V is obtained based on the relationship between the engine revolution number Ne and the speed change gear stage G. In step S4, the slip rate λf is calculated in the slip rate calculating section 302 based on the wheel speed Wf and the vehicle velocity V In step S5, wheel acceleration a, is calculated by differentiating the wheel speed Wf.

In step S6, a reference slip rate λref given as a function of the wheel acceleration a and the slip rate λf are compared with each other. Here, when the slip rate λf exceeds the reference slip rate λref at time t1 in FIG. 5, step S7 is entered to operate the ABS. In step S7, a value representing the operating condition of the ABS (ON representative value) is set in the ABS flag (Fabs).

In step S8, in an ABS executing section 303a of the target angle determining section 303, the target angle θt for the crank mechanism 50 is determined according to the relationship between the vehicle velocity V and the wheel speed Wf, as shown by a broken line in FIG. 5. In the duty ratio determining section 304, a PID control for causing the actual angle θo of the crank mechanism 50 detected by the potentiometer 43 to coincide with the target angle θt is executed, and a duty ratio for driving pulses supplied to the servomotor M is determined.

In step S9, a train of pulses generated by the pulse generating section 305 and based on the duty ratio is supplied to the servomotor M through the driver 306. A normal control of ABS such as this may be continued as long as the slip rate λf exceeds the reference slip rate λref.

Thereafter, at time t2 in FIG. 5, the slip rate λf becomes less than the reference slip rate λref. When the slip rate λf is detected to be less than the reference slip rate λref in step S6 (FIG. 4), step S10 is entered. In step S10, the ABS flag (Fabs) is determined to have an ON representative value and step S11 is entered. In step S11, a value representing an ABS return control (return representative value) is set into the ABS flag (Fabs).

The ABS return control is a process of turning the crank gear 52 to a turning limit restricted by the stopper pin 53 and retracting the expander piston 60 to one end side on the upper side, in order to finish the ABS control and reopen the cut valve 61 and permit inactive ABS braking control, i.e. direct control with brake lever 20.

In step S12, a return timer Trtn initiates counting. In step S13, the ABS return control is executed by a return executing section 303b of the target angle determining section 303.

FIG. 6 is a flowchart showing the operation of the ABS return control according to an embodiment of the present invention. In step S131, it is determined if a target angle fixing timer Tfix has been started. Since the target angle fixing timer Tfix is not yet started at the beginning, it is started in step S132.

In step S133, and as shown in expanded detail in the lower side of FIG. 5, the target angle λt for the crank mechanism 50 is set at a position θp precedent to the turning limit θlmt, and the process returns. Therefore, in the next step S9, a control for turning the actual angle θo of the crankshaft to the position θp precedent to the turning limit θlmt is executed. The precedent angle θp is set in an angle range in which the cut valve 61 can be maintained in an opened condition.

Returning to FIG. 4, in the next period the process goes from step S10 to step S14, where the ABS flag (Fabs) is discriminated as a return representative value, and step S15 is entered. In step S15, it is determined if a return timer Trtn has timed-out. If the return timer Trtn has not yet timed-out, the step S13 is entered, and the return control with the position θp precedent to the turning limit θlmt as a target angle θt is continued.

Thereafter, at time t3 in FIG. 5, the target angle fixing timer Tfix times-out. When this is detected in step S134 of the ABS return control (FIG. 6), step S135 is entered, wherein the target angle θt is brought closer to the turning limit θlmt by a predetermined unit angle Δθ than the present position θp. In step 136, it is determined if the updated target angle θt is equal to or less than the turning limit θlmt. In the beginning, the target angle θt is greater (precedent) than the turning limit θlmt, and the process returns. Therefore, in the next step S9, a control for bringing the actual angle θo of the crankshaft closer to the turning limit θlmt than the present value by the unit angle Δθ is executed.

The process of progressively reducing the target angle θt is continued until the target angle θt reaches the turning limit θlmt. Therefore, the turning angle of the crank mechanism 50, angularly controlled based on the target angle θt, is also progressively reduced toward the turning limit θlmt, as shown in FIG. 5.

Thereafter, at time t4 in FIG. 5, when the target angle θt comes to be equal to or less than the turning limit θlmt and this is detected in step S 136, the target angle θt is fixed at the turning limit θlmt in step S137. The duty ratio determining part 304 executes the PID control for causing the actual angle θo of the crank mechanism 50 to coincide with the target angle θt, and a duty ratio of driving pulses supplied to the servomotor M is determined.

In the PID control at the time of return control, gain of term D is increased (as compared with the PID control in step S8) so that an abrupt return action does not degrade convergence properties.

In the next step S9, a motor control for causing the actual angle θo to coincide with the turning limit θlmt is executed. Thereafter, when the return timer Trtn comes to time-out at time t5 and this is detected in step S15, the return timer Trtn is reset in step S16. In step S17, an OFF representative value is set into the ABS flag (Fabs).

Thus, in the present embodiment, at the time of finishing the ABS control by moving the crank mechanism 50 to the turning limit θlmt, the target angle θt is not set at the turning limit θlmt from the beginning. Instead, the target angle θt is once set at the position θp precedent to the turning limit θlmt and thereafter updated with the turning limit θlmt. Therefore, the turning speed o the crank mechanism 50 is reduced immediately, before the turning limit θlmt is reached.

Thereafter, the target angle θt is updated, and the crank mechanism 50 is again turned to the turning limit θlmt. Since the turning speed of the crank mechanism 50 is once reduced, the kinetic energy of the crank mechanism 50 at the time of reaching the turning limit θlmt is smaller than that in the case where the target angle θt is set at the turning limit θlmt from the beginning. Therefore, the kinetic energy of the crank gear 52 at the time of collision with the stopper portion 53 at the turning limit θlmt can be advantageously reduced.

In addition, since the position θp precedent to the turning limit θlmt is set in an angular range in which the cut valve 61 can be maintained in the opened condition, namely, at a position where the driver's brake operation is reflected in the braking force, the reduction of the turning speed of the crank mechanism 50 immediately before the turning limit θlmt does not at all affect the driver's brake operation.

While in the present embodiment, the cancelling of fixation of the target angle θt in the ABS return control is set at the point of timing-out of the target angle fixing timer Tfix. However, the present invention is not limited to this setting. The cancellation may be set at the time point when the of change of the actual angle θo comes is less than a predetermined value, or at the time point when the differential between the target angle θt and the actual angle θo is less than a predetermined value.

According to the invention, the following advantages and effects can be accomplished over previous systems found in the conventional art. Since a position precedent to the turning limit is set in the beginning as the target angle for turning of the crank mechanism, the turning speed of the crank mechanism is necessarily only reduced once at the position precedent to the turning limit. Thereafter, the target angle is updated and the crank mechanism is again turner to the turning limit.

Since the turning speed of the crank mechanism is reduced, the kinetic energy of the crank mechanism at the time of reaching the turning limit is smaller than that in the case where the target angle is set at the turning limit from the outset. Therefore, the kinetic energy of the crank mechanism at the time of collision against the stopper portion at the turning limit is significantly reduced.

Since the position precedent to the turning limit is made to be the target angle in the beginning, and the position precedent is set in the angular range in which the cut valve can be maintained in the opened condition namely, at a position where the driver's brake operation is reflected in the braking force, the reduction of the turning speed of the crank mechanism does not at all impact the driver's braking operation.

Since the updating of the target angle from the position precedent to the turning limit to the turning limit is executed so that the target angle is progressively changed to the turning limit, the kinetic energy of the crank mechanism at the time of collision with the stopper portion when the turning limit is reached is further reduced.

The invention being thus described, it will obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for an antilock brake system comprising:

an input hydraulic chamber in communication with a master cylinder;

an output hydraulic chamber in communication with a caliper cylinder of a brake;

a cut valve in communication with said input hydraulic chamber and said output hydraulic chamber for providing a hydraulic cutoff condition;

an expander piston for opening said cut valve, wherein said expander piston is located on an open end side of said cut valve in an open position, and said expander piston closes said cut valve by increasing a volume of said output hydraulic chamber in a closed position, wherein said expander position is located in a closed end side in said closed position;

a crank mechanism for displacing said expander piston;

a servomotor for turning said crank mechanism to a predetermined target angle; and a stopper member for setting a turning limit for said crank mechanism, said expander piston is displaced in a step ? reaching said closed position during an ABS operation and being retracted to said open position during a non-ABS operation.

2. The control device according to claim 1, wherein a return control for retracting the expander piston to said open and closed positions comprises a first control procedure of driving said servomotor with a position precedent and a target angle to said turning limit, and a second control procedure of driving said servomotor by updating said target angle with said turning limit.

3. The control device according to claim 2, wherein said crank mechanism is prevented from exceeding the turning limit by said stopper member, said stopper member limiting a displacement of said expander piston between said open and closed positions.

4. The control device according to claim 2, wherein said position precedent to said turning limit is within an angular range in which said cut valve maintains an open condition.

5. The control device according to claim 4, wherein said target angle is progressively updated toward said turning limit by said second procedure.

6. The control device according to claim 2, wherein said target angle is progressively updated toward said turning limit by said second procedure.

7. A method utilizing the control device according to claim 1, wherein a return control retracts the expander piston to said open and closed positions, said method comprising a first control procedure of driving said servomotor with a position precedent and a target angle to said turning limit, and a second control procedure of driving said servomotor by updating said target angle with said turning limit.

8. A control device for an antilock brake system comprising:

an input hydraulic chamber in communication with a master cylinder;

an output hydraulic chamber in communication with a caliper cylinder of a brake;

a cut valve in communication with said input hydraulic chamber and said output hydraulic chamber for providing a hydraulic cutoff condition;

an expander piston for opening said cut valve, wherein said expander piston is located on an open end side of said cut valve in an open position, and said expander piston closes said cut valve l y increasing a volume of said output hydraulic chamber in a closed position, wherein said expander position is located in a closed end side in said closed position;

a return control for retracting the expander piston to said open and closed positions, said return control including means for executing a first control procedure for driving a servomotor with a position precedent and a predetermined target angle to a turning limit, and means for executing a second control procedure for driving said servomotor by updating said target angle with slid turning limit;

a crank mechanism for displacing said expander piston, said servomotor capable of turning said crank mechanism to said predetermined target angle; and a stopper member for setting said turning limit for said crank mechanism, said expander piston is displaced in said closed position during an ABS operation and retracted to said open position during a non-ABS operation.

9. The control device according to claim 8, wherein said servomotor is a DC servomotor and forms a servomotor section of a modulator connected with a crank mechanism.

10. The control device according to claim 9, wherein the crank mechanism comprises:

a pinion axially attached to a rotary shaft of the servomotor, and a semicircular crank gear is engaged with the pinion and axially supported by a crank gear.

11. The control device according to claim 10, wherein a crank pin is eccentrically connected to the crank gear through a crank arm, and said crank arm is connected to a second end of the crank pin.

12. The control device according to claim 11, wherein a turning range of the crank gear is limited by a stopper pin.

13. The control device according to claim 11 further comprising a potentiometer serving as a position sensor fitted to the crank arm.

14. The control device according to claim 13, further comprising:

a control unit controlling a turning angle of the DC servomotor based on a wheel speed value read from a wheel speed sensor, and an output value of the potentiometer representing a crank angle of the crank mechanism.

15. The control device according to claim 11 further comprising:

a cam bearing rotatably fitted to the crank pin, said cam bearing pressable toward a first end by a spring force; and a return spring contained in a spring containing portion for producing said spring force.

16. The control device according to claim 15, wherein the expander piston is engageable with the cam bearing at a position symmetrical with a pressing position of the return spring for facilitating an opening and closing operation of said cut valve.

17. The control device according to claim 8, wherein said turning limit is limited by a stopper pin.

* * * * *